United States Patent
Nonaka et al.

(10) Patent No.: US 12,293,587 B2
(45) Date of Patent: May 6, 2025

(54) INFORMATION PROCESSING APPARATUS, INFORMATION PROCESSING SYSTEM, AND SIGNAGE APPARATUS

(71) Applicant: TOYOTA JIDOSHA KABUSHIKI KAISHA, Toyota (JP)

(72) Inventors: Ryogo Nonaka, Kawasaki (JP); Hirona Ota, Seto (JP); Yuki Tatsumoto, Seto (JP); Tsunehiro Yokomori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 47 days.

(21) Appl. No.: 18/220,594

(22) Filed: Jul. 11, 2023

(65) Prior Publication Data

US 2024/0020984 A1 Jan. 18, 2024

(30) Foreign Application Priority Data

Jul. 14, 2022 (JP) .................. 2022-113123

(51) Int. Cl.
*G06V 20/56* (2022.01)
*G06F 3/14* (2006.01)
*G08G 1/123* (2006.01)

(52) U.S. Cl.
CPC .............. *G06V 20/56* (2022.01); *G06F 3/14* (2013.01); *G08G 1/123* (2013.01)

(58) Field of Classification Search
CPC combination set(s) only.
See application file for complete search history.

(56) References Cited

U.S. PATENT DOCUMENTS

| | | | |
|---|---|---|---|
| 2005/0137754 A1* | 6/2005 | Bartlett | G09F 27/007 701/1 |
| 2015/0100238 A1* | 4/2015 | Cai | G08G 1/127 701/537 |
| 2016/0189438 A1* | 6/2016 | Bang | G08G 1/127 701/29.4 |
| 2018/0349699 A1* | 12/2018 | O'Connell | G06V 20/20 |
| 2020/0175866 A1 | 6/2020 | Yamashita et al. | |
| 2020/0182618 A1* | 6/2020 | Xu | G06F 18/214 |
| 2020/0184273 A1* | 6/2020 | Jannink | G06F 18/214 |
| 2022/0375235 A1* | 11/2022 | Tematsu | G06V 30/18162 |
| 2023/0290197 A1* | 9/2023 | Nishio | H04N 7/188 |

FOREIGN PATENT DOCUMENTS

| | | |
|---|---|---|
| JP | 2011-227550 A | 11/2011 |
| JP | 2013-206054 A | 10/2013 |
| JP | 2020-091574 A | 6/2020 |

* cited by examiner

Primary Examiner — Tracy Y. Li
(74) Attorney, Agent, or Firm — Oliff PLC

(57) ABSTRACT

An information processing apparatus comprises a controller configured to: acquire a first image that is obtained by capturing an external appearance of a first vehicle that is operated as an on-demand bus; and provide the first image to a first user who is to get on board the first vehicle.

10 Claims, 17 Drawing Sheets

| VEHICLE ID | DATE/TIME INFORMATION | ROUTE INFORMATION | POSITION INFORMATION | VEHICLE INFORMATION |
|---|---|---|---|---|
| V00001 | X | ... | BETWEEN X001-X002 | ... |

| APPARATUS ID OF TRANSMISSION DESTINATION | DATE/TIME INFORMATION | FIRST VEHICLE | | | | SECOND VEHICLE | | | | |
|---|---|---|---|---|---|---|---|---|---|---|
| | | ROUTE INFORMATION | ARRIVAL TIME | VEHICLE INFORMATION | IMAGE DATA | ROUTE INFORMATION | ARRIVAL TIME | VEHICLE INFORMATION | IMAGE DATA | |
| S00001 | ... | ... | ... | ... | ... | ... | ... | ... | ... | ... |

SIGNAGE DATA

| APPARATUS ID | STOP ID | ADDRESS | ... |
|---|---|---|---|
| S00001 | X11 | ... | ... |

FIG.8A

ROUTE DATA

| ROUTE ID | STOP ID | VIA POINT | TERMINAL POINT ID |
|---|---|---|---|
| R00001 | X01 | X02, X03⋯ | X11 |

FIG.8B

| USER ID | USER INFORMATION | SETTLEMENT INFORMATION | ... |
|---------|------------------|------------------------|-----|
| U001 | ... | ... | ... |
| ... | ... | ... | ... |

FIG.9

| SERIAL NO. | USER ID | RESERVATION DATE/TIME | BOARDING DATE/TIME | BOARDING POINT | ALIGHTING POINT | |
|---|---|---|---|---|---|---|
| 1 | U001 | ... | ... | ... | ... | ... |
| 2 | U002 | ... | ... | ... | ... | ... |
| 3 | U003 | ... | ... | ... | ... | ... |
| 4 | ... | ... | ... | ... | ... | ... |

FIG.10

BUS DETAILS

SYSTEM 001 TO XXXXX
ARRIVING IN 3 MINS
 MINIBUS
 CROWDEDNESS : ☆☆

EXTERNAL APPEARANCE OF
VEHICLE (CAPTURED AT 13:00)

RETURN

INFORMATION PROCESSING APPARATUS, INFORMATION PROCESSING SYSTEM, AND SIGNAGE APPARATUS

CROSS REFERENCE TO THE RELATED APPLICATION

This application claims the benefit of Japanese Patent Application No. 2022-113123, filed on Jul. 14, 2022, which is hereby incorporated by reference herein in its entirety.

BACKGROUND

Technical Field

The present disclosure relates to a bus.

Description of the Related Art

On-demand buses that are operated according to requests from users are known. An on-demand bus allows a user to get on or off the bus at a designated point based on a request.

In this regard, Japanese Patent Laid-Open No. 2020-091574 discloses a system that issues a notification to a user apparatus when a vehicle one is scheduled to get on is approaching, for example.

SUMMARY

The present disclosure is aimed at increasing convenience of a user of an on-demand bus.

The present disclosure in its one aspect provides an information processing apparatus comprising a controller configured to: acquire a first image that is obtained by capturing an external appearance of a first vehicle that is operated as an on-demand bus; and provide the first image to a first user who is to get on board the first vehicle.

The present disclosure in its another aspect provides an information processing system comprising at least one signage apparatus installed at, at least one stop where an on-demand bus travels to or through, and an information processing apparatus that provides information about the on-demand bus via the at least one signage apparatus, wherein the information processing apparatus includes a first controller configured to: acquire a first image that is obtained by capturing an external appearance of a first vehicle that is operated as the on-demand bus; and provide the first image to a first user who is to get on board the first vehicle, via one of the at least one signage apparatus.

The present disclosure in its another aspect provides a signage apparatus that is communicably connected to an information processing apparatus that manages operation of an on-demand bus, and that is installed at a stop where the on-demand bus arrives, the signage apparatus comprising a controller configured to: capture a first vehicle arriving at the stop by a camera, and transmit first image data that is obtained to the information processing apparatus; and receive, from the information processing apparatus, second image data that is obtained by capturing a second vehicle that is scheduled to arrive at the stop, and output the second image data.

As another mode, there may be cited a program for causing a computer to perform a method that is performed by the apparatus described above, or a non-transitory computer-readable storage medium storing the program.

According to the present disclosure, convenience of a user of an on-demand bus may be increased.

BRIEF DESCRIPTION OF THE DRAWINGS

FIG. 3 is an example of vehicle data that is transmitted from the vehicle-mounted apparatus 100;

FIG. 7 is an example of the guide data that is delivered to the signage 300;

FIG. 8A is an example of signage data that is stored in a storage 202;

FIG. 8B is an example of route data that is stored in the storage 202;

FIG. 9 is an example of user data that is stored in the storage 202;

FIG. 10 is an example of request data that is stored in the storage 202;

DESCRIPTION OF THE EMBODIMENTS

Figure 1:
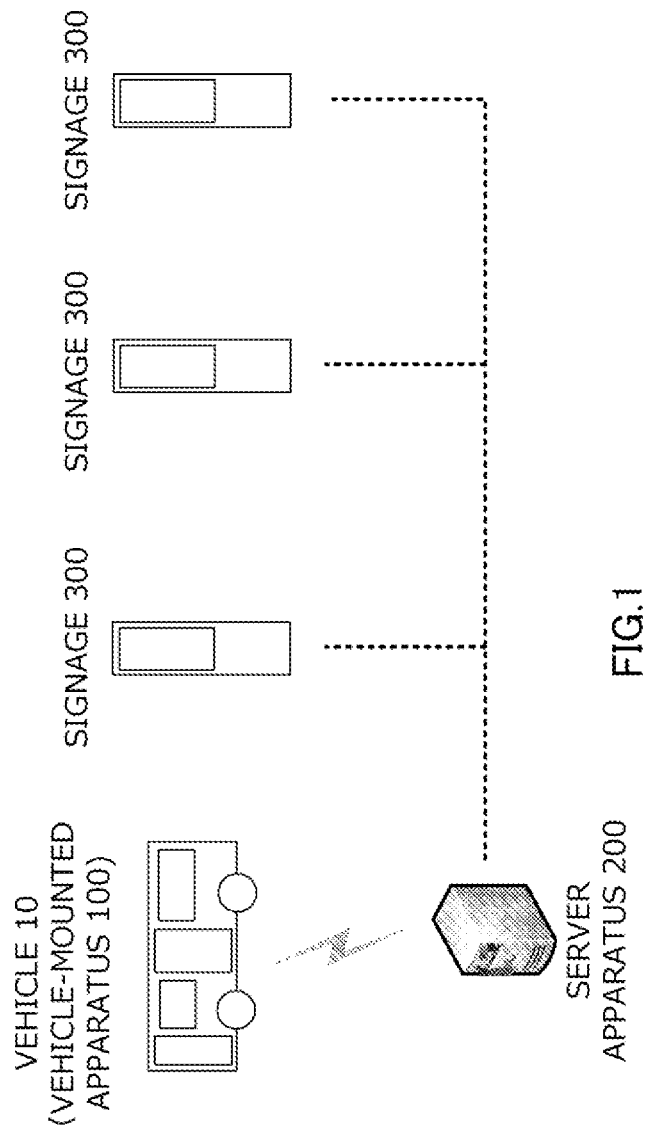
FIG. 1 is a schematic diagram of an on-demand transport system according to a first embodiment.

An on-demand bus that is operated based on a request from a user is known. An on-demand bus is a shared vehicle, an operation route, an operation schedule or the like of which is determined based on a request from a user.

An on-demand bus may be operated as a vehicle that is different each time depending on the number of passengers or the like. That is, the on-demand bus that is operated may not be a certain vehicle as in the case of a route bus. Furthermore, in the case where there are a plurality of businesses in charge of operation, design or color of the vehicle may be different each time.

That is, with an on-demand transport system, there is a problem that it is difficult for a user to know in advance the design of a vehicle that is arriving. Furthermore, unlike a route bus, with an on-demand bus, a specific destination or a route number is possibly not displayed, and there is a problem that it is difficult for the user to grasp which vehicle to get on.

An information processing apparatus according to the present disclosure solves such problems.

An information processing apparatus according to a mode of the present disclosure includes a controller configured to: acquire a first image that is obtained by capturing an external appearance of a first vehicle that is operated as an on-demand bus, and provide the first image to a first user who is to get on board the first vehicle.

The information processing apparatus according to the mode is typically a server apparatus that manages operation of the on-demand bus.

The on-demand bus is a shared vehicle that is operated according to a request from a user. In the present embodiment, the on-demand bus picks up a user according to a boarding request from the user.

The first image is an image that is obtained by capturing an external appearance of the first vehicle that is operated as the on-demand bus. The first image may be an image that is captured in advance (for example, at a car depot), or may be an image that is captured during operation.

The first image may be output via a signage apparatus that is installed at a stop (a first stop) where the first vehicle is to arrive, for example.

This allows the first user to grasp, at the stop, the external appearance of the bus that he/she is to get on, for example. Additionally, the first stop where the first image is to be provided may be identified based on operation information on the on-demand bus, position information on the first vehicle, or the like.

Additionally, the first image may be captured by a camera of a second signage apparatus that is installed at a second stop where the first vehicle arrives at before the first stop. In the case where the signage apparatus includes a built-in camera or the like, a configuration as described above enables a latest image of the first vehicle to be acquired.

Additionally, the information processing apparatus may include a storage configured to store a plurality of images that are obtained by capturing external appearances of a plurality of vehicles.

Images of a plurality of on-demand buses captured by a plurality of signage apparatuses may be accumulated in the storage. Furthermore, the images may be associated with position information, the operation information, or the like of corresponding vehicles. It is thus possible to determine a vehicle whose image is to be transmitted, and a stop whose signage apparatus is to receive the image.

In the following, a specific embodiment of the present disclosure will be described with reference to the drawings. A hardware configuration, a module configuration, a functional configuration, and the like described in the embodiment are not intended to limit the technical scope of the disclosure the configurations unless stated otherwise.

First Embodiment

An outline of an on-demand transport system according to a first embodiment will be given with reference to FIG. 1. The on-demand transport system according to the present embodiment includes a vehicle 10 where a vehicle-mounted apparatus 100 is mounted, a server apparatus 200, and a plurality of signages 300. The number of vehicles 10 (the vehicle-mounted apparatuses 100) and the number of signages 300 included in the system may be more than one.

The vehicle 10 is a shared vehicle on which the vehicle-mounted apparatus 100 is mounted and that is operated on demand. The vehicle-mounted apparatus 100 is capable of performing wireless communication with the server apparatus 200, and the vehicle 10 travels based on an instruction that is received from the server apparatus 200. The vehicle 10 may be a vehicle that is driven by a driver, or may be an autonomous vehicle.

In the following, the vehicle 10 is also referred to as an on-demand bus or a bus.

The signage 300 is an apparatus that is installed at a stop of the on-demand bus, and that displays an image using a display, a projector or the like. By using the signage 300, an arrival time or operation information on the bus may be provided to a user waiting for arrival of the bus. Additionally, the signage 300 may also include a function of outputting audio, or a function of acquiring input.

In the present embodiment, the signage 300 includes a camera, and is capable of capturing an external appearance of a passing bus. The signage 300 transmits image data that is obtained by capturing a bus to the server apparatus 200.

The server apparatus 200 is an apparatus that controls operation of the on-demand bus.

Firstly, the server apparatus 200 receives a boarding request from a wide area network (such as the Internet), and determines operation routes and operation schedules of a plurality of vehicles 10 that are being managed, based on boarding requests from a plurality of users. Furthermore, information giving instructions regarding the determined operation route and operation schedule is transmitted to the vehicle-mounted apparatus 100 mounted on the vehicle 10.

Secondly, the server apparatus 200 receives data about operation from the vehicle 10 (the vehicle-mounted apparatus 100), and delivers data for giving guide about operation of the bus to the signage 300 based on the data.

More specifically, the server apparatus 200 receives, from a plurality of vehicles 10 (the vehicle-mounted apparatuses 100) that are being managed, data about operation of the buses, and causes the data to be stored in a database. Furthermore, the server apparatus 200 acquires, from the signage 300, an image that is obtained by capturing a bus passing nearby, and causes the image to be stored in the database.

Furthermore, the server apparatus 200 generates, based on data stored in the database, data to be provided to each of the plurality of signages 300, and delivers the data to each signage 300 at a predetermined timing. The data includes both the operation information on a bus, and the image data on the external appearance of the bus. Moreover, the signage 300 provides information based on the data that is received. Information about a bus that is being operated may thus be provided to a user waiting at a stop. Moreover, the external appearance of the bus heading toward the stop may be presented to the user.

Each element forming the system will be described.

The vehicle 10 is a vehicle that is operated as the on-demand bus, and is a connected car that includes a function of communicating with an external network. The vehicle-mounted apparatus 100 is mounted on the vehicle 10.

The vehicle-mounted apparatus 100 is a computer that is mounted on the vehicle 10. The vehicle-mounted apparatus 100 transmits various information pieces about operation, including position information, to the server apparatus 200 via a wireless network. Furthermore, the vehicle-mounted apparatus 100 receives instructions regarding operation (an operation route, an operation schedule, presence/absence of a boarding reservation, and the like) from the server apparatus 200, and provides the same to the driver or a crew member (or an apparatus controlling autonomous driving).

The vehicle-mounted apparatus 100 may also serve as an apparatus that provides information to the driver or a crew member of the bus or to a passenger. For example, the vehicle-mounted apparatus 100 may be an appliance (hereinafter "operation-related appliance") that provides guide about operation to a passenger. For example, as the operation-related appliance, an appliance that controls a destination display unit or an announcement device of the vehicle 10 may be cited.

The vehicle-mounted apparatus 100 may be a computer including processors such as a CPU and a GPU, main memories such as a RAM and a ROM, and an auxiliary memory such as an EPROM, a hard disk drive, a removable medium, or the like. The auxiliary memory stores an operating system (OS), various programs, various tables and the like, and each function matching a predetermined purpose as described below may be implemented by executing a program stored therein. However, one or some or all of the functions may instead be implemented by a hardware circuit such as an ASIC or an FPGA.

Figure 2:
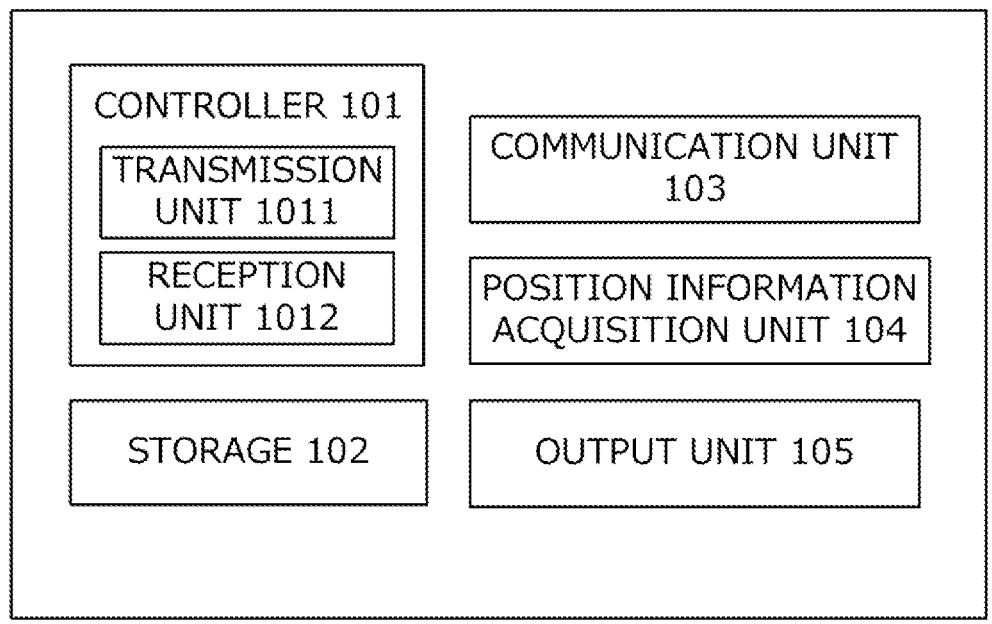
FIG. 2 is a diagram illustrating structural elements of a vehicle-mounted apparatus 100.

FIG. 2 is a diagram illustrating structural elements of the vehicle-mounted apparatus 100 in detail.

The vehicle-mounted apparatus 100 includes a controller 101, a storage 102, a communication unit 103, a position information acquisition unit 104, and an output unit 105.

The controller 101 is an arithmetic unit that implements various functions of the vehicle-mounted apparatus 100 by executing predetermined programs. For example, the controller 101 may be implemented by the CPU or the like.

As functional modules, the controller 101 includes a transmission unit 1011 and a reception unit 1012. Each functional module may be implemented by executing a program that is stored, by the CPU.

The transmission unit 1011 acquires or generates data about operation of the vehicle 10, and transmits the same to the server apparatus 200 at a predetermined timing. The data about operation of the vehicle 10 (hereinafter "vehicle data") is an operation route, a destination, a current traveling position (stops between which traveling is being performed), and the like, for example. These information pieces may be acquired from the operation-related appliance (for example, the appliance that controls guide announcement, the destination display unit, or the like) that is mounted on the vehicle, for example. The transmission unit 1011 generates the vehicle data every predetermined period of time, and transmits the same to the server apparatus 200.

FIG. 3 is an example of the vehicle data.

The vehicle data includes fields of vehicle ID, date/time information, route information, position information, and vehicle information. The field "vehicle ID" stores an identifier for uniquely identifying the vehicle 10. The field "date/time information" stores date/time of generation of the vehicle data.

The field "route information" stores information about the operation route of the vehicle 10.

The field "position information" stores a section where the vehicle 10 is currently traveling. For example, the position information may be indicated by latitude and longitude, or may be indicated by an ID of a stop. For example, the position information may be information such as "traveling from stop X1 to X2".

The position information may be acquired via the position information acquisition unit 104 described later. The position information may also be acquired from the operation-related appliance described above. For example, the section being traveled may be determined based on data that is acquired from the operation-related appliance.

The vehicle data may include other information pieces (vehicle information) about the vehicle 10. Such information may be the type of the vehicle 10 (such as a low-floor bus), or information about facilities of the vehicle 10 (such as a wheelchair space and a wheelchair ramp), for example.

The storage 102 is a unit for storing information, and is a storage medium such as a RAM, a magnetic disk, a flash memory, or the like. The storage 102 stores various programs to be executed by the controller 101, data to be used by the programs, and the like.

The communication unit 103 includes an antenna and a communication module for performing wireless communication. The antenna is an antenna element for performing input/output of wireless signals. In the present embodiment, the antenna is compatible with mobile communication (for example, mobile communication such as 3G, LTE, or 5G). Additionally, the antenna may include a plurality of physical antennas. For example, in the case of performing mobile communication using radio waves in a high-frequency band, such as microwaves or millimeter waves, a plurality of antennas may be disposed in a distributed manner to stabilize communication. The communication module is a module for performing mobile communication.

The position information acquisition unit 104 includes a GPS antenna and a positioning module for measuring the position information. The GPS antenna is an antenna that receives a positioning signal that is transmitted from a positioning satellite (also referred to as a GNSS satellite). The positioning module is a module that calculates the position information based on a signal that is received by the GPS antenna.

The output unit 105 is a unit that outputs information, and may be a display device, an audio output device, or the like, for example. In the case where the operation-related appliance is mounted on the vehicle 10, the output unit 105 may perform output of images, sound, or the like in conjunction with the appliance.

Next, the server apparatus 200 will be described. Firstly, the server apparatus 200 performs processes of receiving data requesting boarding on an on-demand bus from the wide area network, and transmitting data instructing operation to a target bus (the vehicle 10). Secondly, the server apparatus 200 performs processes of generating data for giving guide to a user, based on the vehicle data collected from a plurality of vehicles 10 (the vehicle-mounted apparatuses 100) and the image data collected from a plurality of signages 300, and transmitting the data to the signage 300.

Figure 4:
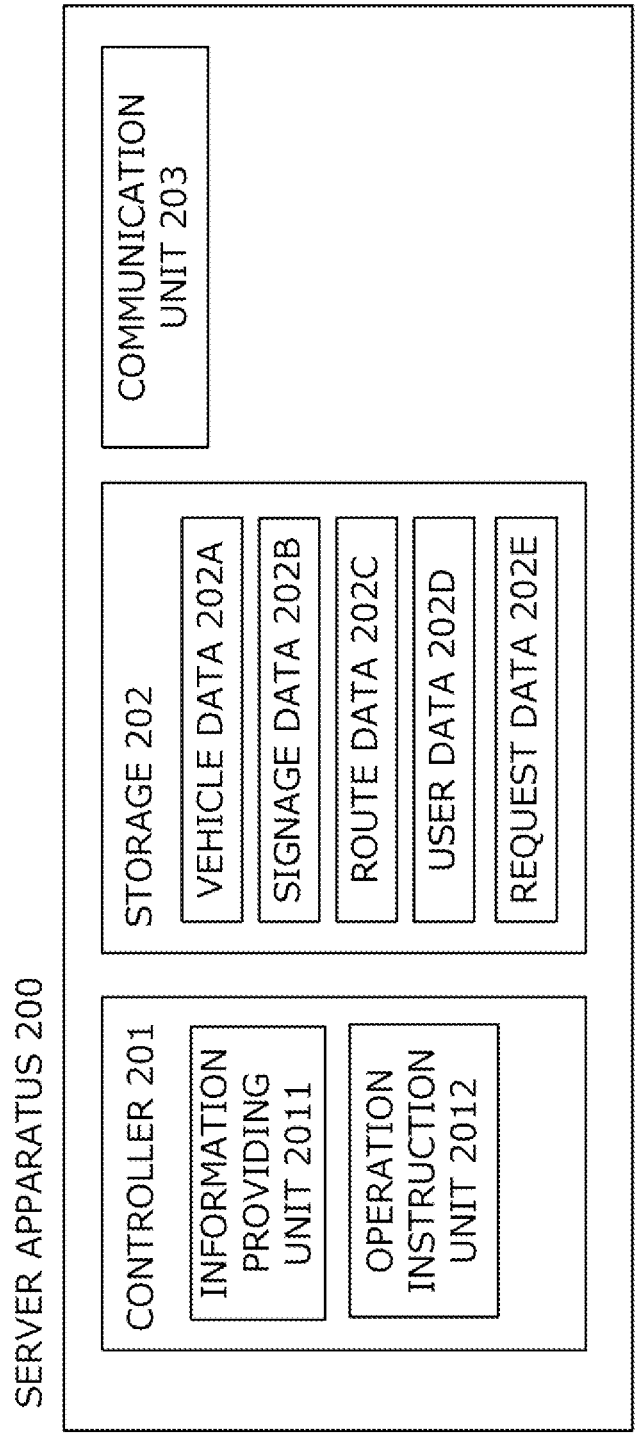
FIG. 4 is a diagram illustrating structural elements of a server apparatus 200.

FIG. 4 is a diagram illustrating in detail structural elements of the server apparatus 200 included in the on-demand transport system according to the present embodiment.

The server apparatus 200 may be a computer including processors such as a CPU and a GPU, main memories such as a RAM and a ROM, and an auxiliary memory such as an EPROM, a hard disk drive, a removable medium, or the like. The auxiliary memory stores an operating system (OS), various programs, various tables, and the like, and each function matching a predetermined purpose as described below may be implemented by loading a program stored therein into a work area of the main memory and executing the same such that each structural unit is controlled through execution of the program. However, one or some or all of the functions may instead be implemented by a hardware circuit such as an ASIC or an FPGA.

The server apparatus 200 includes a controller 201, a storage 202, and a communication unit 203.

The controller 201 is an arithmetic device in charge of control that is performed by the server apparatus 200. The controller 201 may be implemented by an arithmetic processing device such as the CPU.

As functional modules, the controller 201 includes an information providing unit 2011 and an operation instruction unit 2012. Each functional module may be implemented by executing a program that is stored, by the CPU.

The information providing unit 2011 generates guide data based on the vehicle data collected from the vehicle 10, the image data collected from the signage 300, and data about the stop and the signage that is stored in advance. The guide data is data that is transmitted to the signage 300 installed at each stop, and that is for giving guide to a user.

Figure 5:
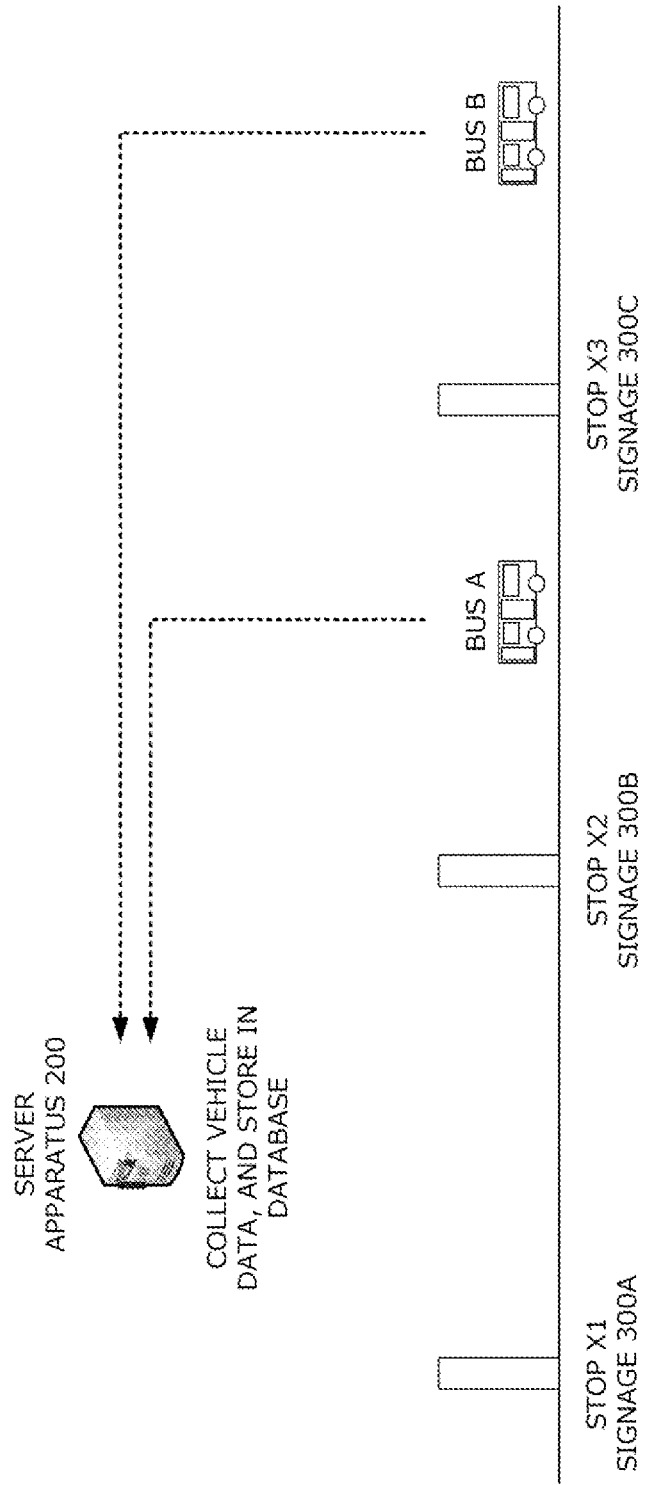
FIG. 5 is a diagram describing a process of generating guide data.

FIG. 5 is a diagram describing a process of generating the guide data. Here, the signages installed at a stop X1, a stop X2, and a stop X3 are distinguished from each other by being denoted by reference signs 300A, 300B, and 300C, respectively.

In the illustrated example, a bus A and a bus B are approaching the stops X1 and X2. Furthermore, the bus B is approaching the stop X3. A stop where a bus that is traveling travels to or through may be determined by referring to data about a route (described later) that is stored in advance.

The vehicle data is periodically transmitted from the bus A and the bus B to the server apparatus 200. The server apparatus 200 may grasp which bus is currently traveling through which location, based on the vehicle data.

Furthermore, the server apparatus 200 receives, from each signage 300, the image data that is obtained by capturing a bus passing nearby.

Figure 6:
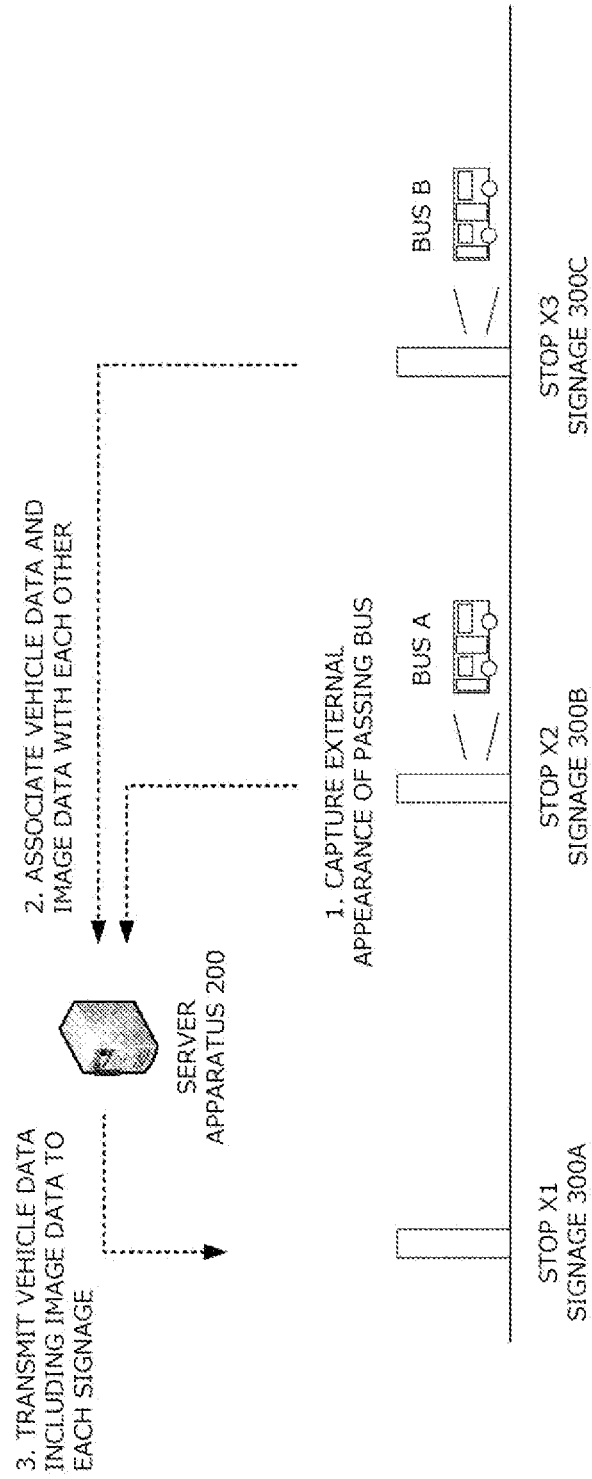
FIG. 6 is a diagram describing capturing of a bus by a signage 300.

FIG. 6 is a diagram describing capturing of a bus by the signage 300. In the illustrated example, the bus A is arriving at the stop X2, and the bus B is arriving at the stop X3. The signage 300B captures the external appearance of the bus A and the signage 300C captures the external appearance of the bus B at this timing. The image data that is obtained is transmitted to the server apparatus 200 together with a timestamp.

The server apparatus 200 associates the image data and the vehicle data with each other by using the timestamp.

Here, in the case where there is a rule that "the signage 300 is to display information about a bus that departed a stop that is three stops before", the information providing unit 2011 determines that the signage 300A installed at the stop X1 is to output information about the buses A and B. Furthermore, the information providing unit 2011 determines that the signage 300B installed at the stop X2 is to output information about the buses A and B. Moreover, the information providing unit 2011 determines that the signage 300C installed at the stop X3 is to output information about the bus B.

Moreover, the information providing unit 2011 generates data to be transmitted to each signage 300. That is, the information providing unit 2011 performs the following processes:

(1) generate the guide data to be transmitted to the signages 300A and 300B, based on the vehicle data transmitted from the bus A and the bus B (and corresponding image data), and
(2) generate the guide data to be transmitted to the signages 300B and 300C, based on the vehicle data transmitted from the bus B (and corresponding image data).

The guide data includes information that is to be output by each signage 300.

FIG. 7 is an example of the guide data that is transmitted from the server apparatus 200 to the signage 300. The guide data includes an identifier of the signage 300 that is a data transmission destination, and date/time information. Furthermore, the guide data includes a set of route information, a predicted time until arrival, vehicle information, and image data related to a bus. Such data is defined for each vehicle. For example, in the illustrated example, data on two vehicles, that is, a vehicle that is arriving next and a vehicle that is arriving after the vehicle that is arriving next, is included.

Referring back to FIG. 4, the operation instruction unit 2012 will be described.

The operation instruction unit 2012 instructs operation of the vehicle 10 based on a boarding request transmitted from the wide area network (such as the Internet).

The operation instruction unit 2012 determines the number of vehicles 10 to be operated, the operation route of each vehicle, the operation schedule, and the like based on a plurality of boarding requests collected in a predetermined period of time. Furthermore, the operation instruction unit 2012 generates data (an operation instruction) for issuing an instruction regarding the operation route and the operation schedule to the vehicle 10. The operation instruction that is generated is transmitted to the vehicle-mounted apparatus 100 of a corresponding vehicle 10.

The storage 202 includes a main memory and an auxiliary memory. The main memory is a memory where a program to be executed by the controller 201, and data to be used by the control program are developed. The auxiliary memory is a device that stores the program to be executed by the controller 201, and the data to be used by the control program.

Furthermore, the storage 202 stores vehicle data 202A, signage data 202B, route data 202C, user data 202D, and request data 202E.

The vehicle data 202A is a collection of a plurality of pieces of vehicle data transmitted from the vehicle-mounted apparatuses 100. A plurality of pieces of vehicle data described with reference to FIG. 3 are stored in the vehicle data 202A. Additionally, the vehicle data 202A that is stored may be deleted at a predetermined timing (such as a timing of lapse of a predetermined time from reception).

The signage data 202B is data about the signages 300 that are installed at a plurality of stops.

Furthermore, the route data 202C is data about a route along which a bus that is being managed by the apparatus travels. With the on-demand transport system according to the present embodiment, the server apparatus 200 dynamically determines the operation route of the bus.

FIG. 8A illustrates an example of the signage data 202B.

The signage data 202B includes the identifier of a signage 300, an identifier of the stop where the signage is installed, a network address of the signage, and the like. The server apparatus 200 may identify a transmission destination of the guide data by referring to the signage data 202B.

FIG. 8B illustrates an example of the route data 202C.

The route data 202C includes an identifier of a route, an identifier of a stop that is a starting point, an identifier of a stop that is a via point, an identifier of a stop that is a terminal point, and the like. The server apparatus 200 may identify a stop that a bus travels to or through, by referring to the route data 202C. Additionally, in the case where the operation route of a bus is dynamically determined, the route data 202C may be updated every time operation of a bus is determined.

The user data 202D is data about a user of the transport service by the on-demand bus. The user data stores user information that is registered in advance.

FIG. 9 is an example of the user data 202D.

The user data 202D includes fields of user ID, user information, and settlement information.

The field "user ID" stores an identifier for uniquely identifying a user of the transport service. The field "user information" stores personal information or the like of the user. The field "settlement information" stores information for settling a fee of the on-demand bus. As the settlement information, credit card information, electronic money information, and the like may be cited, for example.

The request data 202E is a collection of boarding requests from users. FIG. 10 is an example of the request data 202E. The request data 202E includes fields of user ID, a reservation date/time, a boarding date/time, a boarding point, and an alighting point. By matching a plurality of pieces of request data 202E with each other, the operation instruction unit 2012 may determine the operation route and the operation schedule of the vehicle 10.

The communication unit 203 is a communication interface for connecting the server apparatus 200 to a network. For example, the communication unit 203 includes a network interface board, or a wireless communication interface for wireless communication.

Next, the signage 300 will be described.

The signage 300 is an apparatus that gives guide to a user waiting at a stop, based on the guide data that is transmitted from the server apparatus 200.

Figure 11:
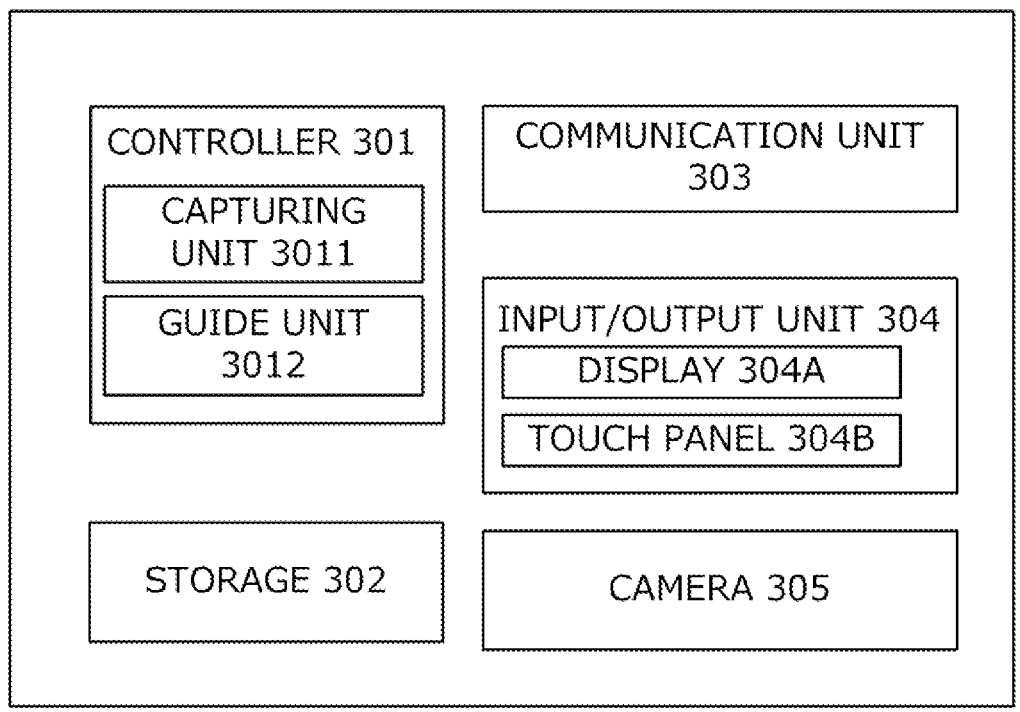
FIG. 11 is a diagram illustrating structural elements of the signage 300.

FIG. 11 is a diagram illustrating, in detail, structural elements of the signage 300 included in the on-demand transport system according to the present embodiment.

The signage 300 may be a computer including processors such as a CPU and a GPU, main memories such as a RAM and a ROM, and an auxiliary memory such as an EPROM, a hard disk drive, a removable medium, or the like. However, one or some or all of the functions may instead be implemented by a hardware circuit such as an ASIC or an FPGA.

The signage 300 includes a controller 301, a storage 302, a communication unit 303, an input/output unit 304, and a camera 305.

The controller 301 is an arithmetic device in charge of control that is performed by the signage 300. The controller 301 may be implemented by an arithmetic processing device such as the CPU.

As functional modules, the controller 301 includes a capturing unit 3011 and a guide unit 3012. Each functional module may be implemented by executing a program that is stored, by the CPU.

The capturing unit 3011 captures a bus arriving at or passing through the stop using the camera 305 described later, and acquires the image data. For example, the capturing unit 3011 may detect arrival of the on-demand bus by performing road-to-vehicle communication with the vehicle-mounted apparatus 100. The capturing unit 3011 transmits the acquired image data to the server apparatus 200 together with a timestamp.

The guide unit 3012 generates a user interface screen based on the guide data received from the server apparatus 200, and outputs the same via the input/output unit 304.

Figure 12:
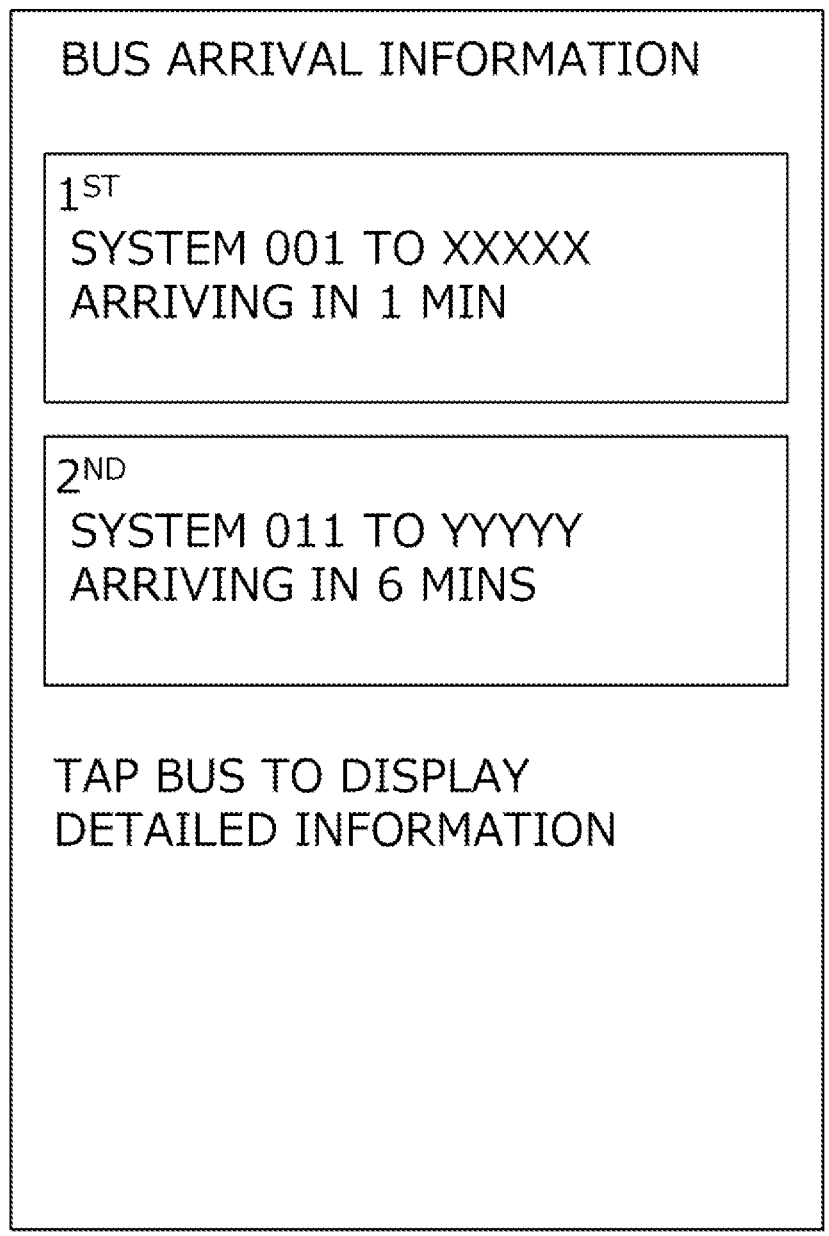
FIG. 12 is an example of a screen that is output to the signage 300.

FIG. 12 is an example of the user interface screen that is generated by the guide unit 3012 based on the guide data illustrated in FIG. 7, and that is output via the input/output unit 304. Additionally, in the case where the guide data includes data about a plurality of buses, the guide unit 3012 may generate a user interface screen including information pieces about the plurality of buses. Furthermore, in the case where an arrival time is indicated by a remaining time, the guide unit 3012 may measure time, and update time display.

Figure 13:
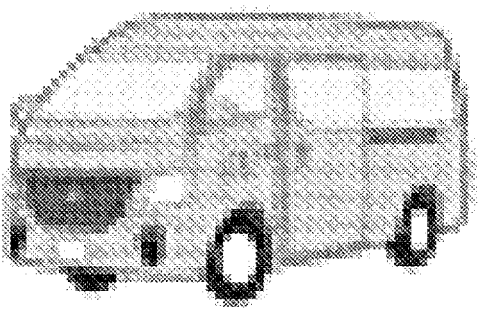
FIG. 13 is an example of the screen that is output to the signage 300.

When a user selects a bus via the input/output unit 304, the guide unit 3012 outputs detailed information about the bus based on the guide data. FIG. 13 is an example of the user interface screen including detailed information about a bus. As illustrated, the user interface screen includes an image that is obtained by capturing the external appearance of the bus, in addition to information about operation of the bus.

The storage 302 includes a main memory and an auxiliary memory. The main memory is a memory where a program to be executed by the controller 301, and data to be used by the control program are developed. The auxiliary memory is a device that stores the program to be executed by the controller 301, and the data to be used by the control program.

The communication unit 303 is a communication interface for connecting the signage 300 to a network. For example, the communication unit 303 includes a network interface board, or a wireless communication interface for wireless communication.

The input/output unit 304 is a device that is used for inputting/outputting information. More specifically, the input/output unit 304 includes a display 304A and a touch panel 304B. In the present embodiment, the touch panel and the display are one touch panel display. The input/output unit 304 may include a unit that outputs audio (such as an amplifier and a speaker).

The input/output unit 304 may output an image by the display 304A, and may receive input by the touch panel 304B.

The camera 305 is an image sensor that is installed on a housing of the signage 300. The camera 305 is installed facing a road, and is capable of capturing the external appearance of a vehicle arriving at the stop or passing through the stop.

Additionally, the configurations illustrated in FIGS. 2, 4, and 11 are merely examples, and one or some or all of the illustrated functions may be executed using a dedicated circuit. Furthermore, a program may be stored and executed by a combination of a main memory and an auxiliary memory other than those illustrated.

Next, a process that is performed by each apparatus will be described.

Figure 14:
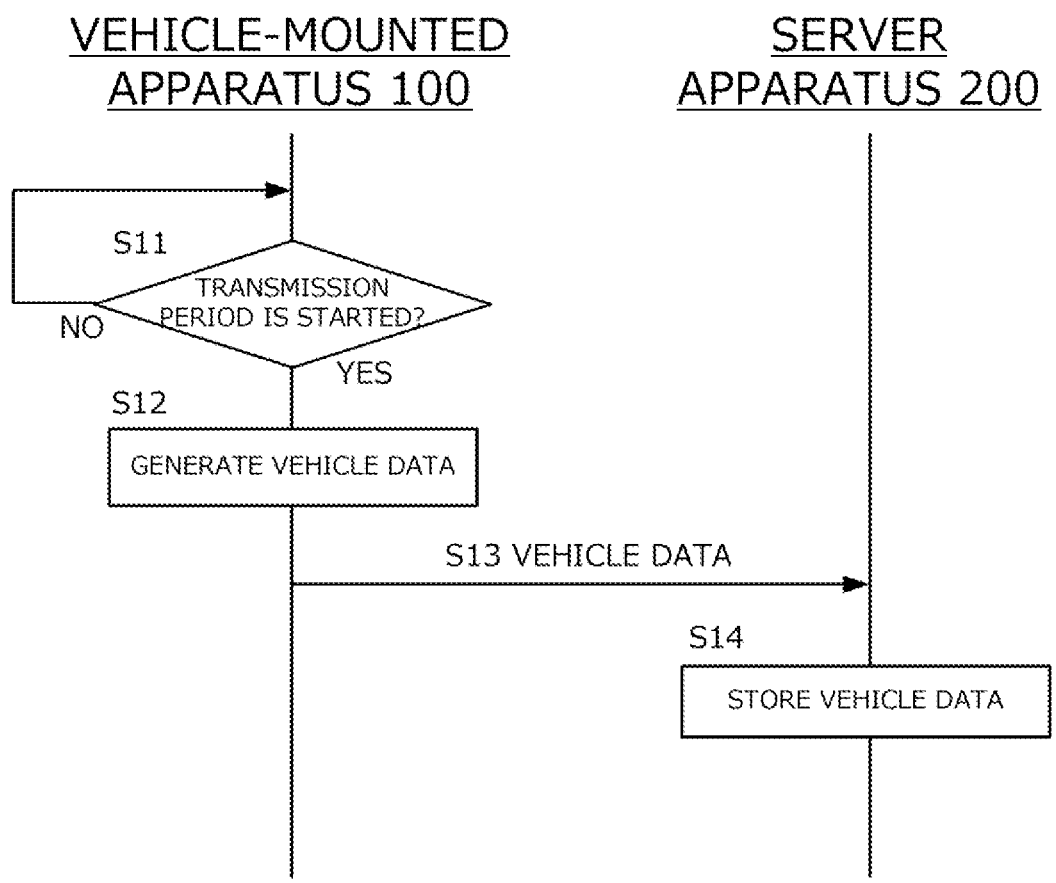
FIG. 14 is a sequence diagram of a process of transmission of the vehicle data by the vehicle-mounted apparatus 100.

FIG. 14 is a sequence diagram of a process of transmission of the vehicle data from the vehicle-mounted apparatus 100 to the server apparatus 200. The illustrated process is repeated every predetermined period of time during traveling of the vehicle 10.

First, in step S11, the transmission unit 1011 determines whether a predetermined transmission period is started or not. In the case where a predetermined period (a period of one minute, for example) is started, the process proceeds to step S12. In the case where the predetermined period is not started, standby is performed for a predetermined time, and the process is repeated. In step S12, the transmission unit 1011 generates the vehicle data. As described above, the vehicle data may be acquired via the operation-related appliance mounted on the vehicle 10 or the position information acquisition unit 104.

The vehicle data that is generated is transmitted to the server apparatus 200 in step 313.

In step S14, the server apparatus 200 (the information providing unit 2011) receives the vehicle data that is transmitted from the vehicle-mounted apparatus 100, and stores the same in the storage 202.

Pieces of the vehicle data that are received from a plurality of vehicles 10 are thus accumulated as appropriate in the storage 202 of the server apparatus 200.

Figure 15:
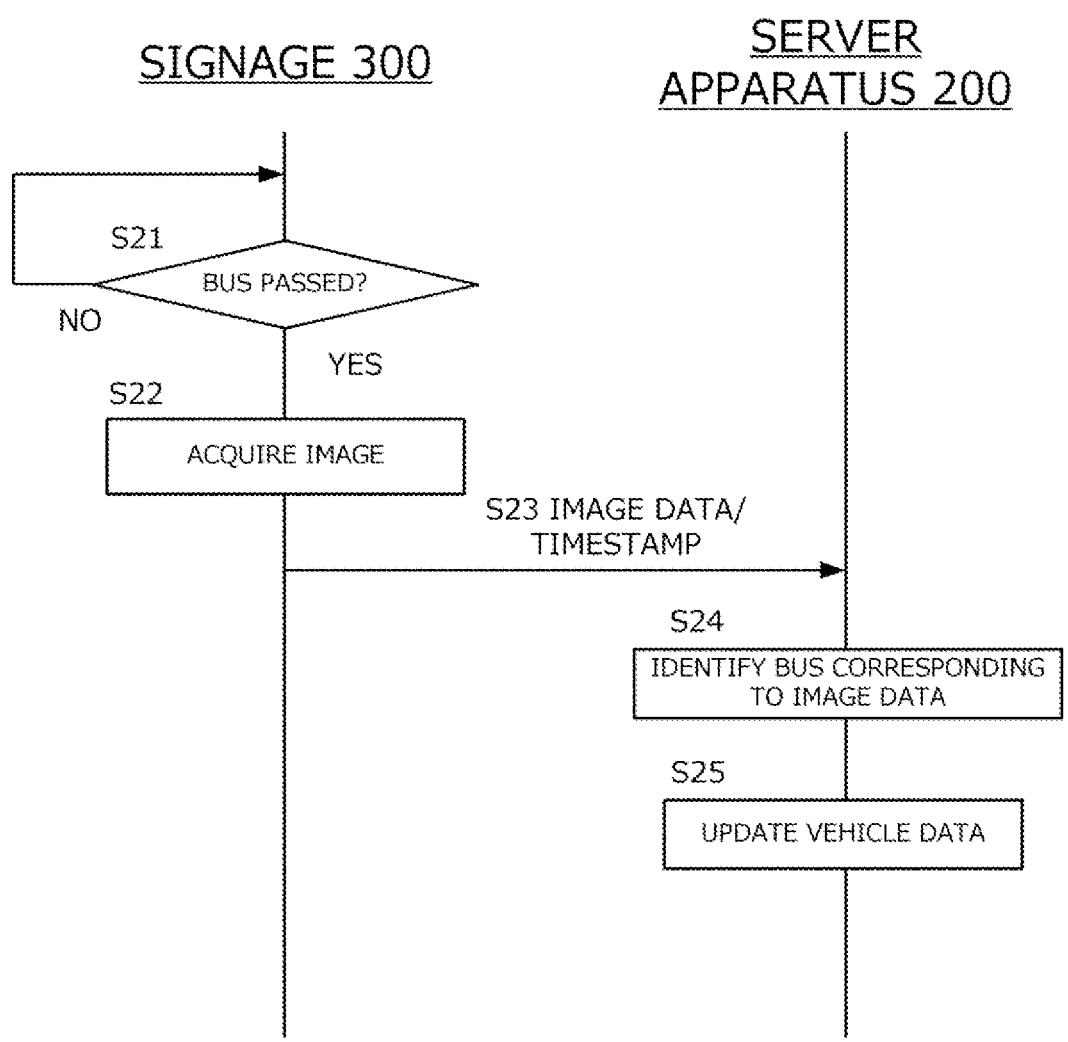
FIG. 15 is a sequence diagram of a process of transmission of image data by the signage 300.

FIG. 15 is a sequence diagram of a process of transmission of the image data from the signage 300 to the server apparatus 200. The illustrated process is repeated every predetermined period of time for each of the plurality of signages 300.

First, the capturing unit 3011 of the signage 300 determines whether an on-demand bus passed through a target stop or not (step S21). Passing of an on-demand bus may be determined by using the camera 305, for example. The capturing unit 3011 may also detect presence of an on-demand bus by performing wireless communication with the vehicle-mounted apparatus 100. In the case where an on-demand bus passed through the target stop, the process proceeds to step S22, and the external appearance of the target bus is captured using the camera 305, and the image data is acquired. The image data that is acquired is temporarily stored in association with a timestamp.

In step S23, the image data that is stored is transmitted to the server apparatus 200 together with the timestamp. In step S24, the server apparatus 200 stores the image data that is received.

In step S24, the server apparatus 200 identifies the bus that is included in the image data that is received. In the present step, the bus that passed through the stop where the signage 300 that transmitted the image data is installed, at a time indicated by the timestamp, is identified. A bus that passed through a certain stop at a certain time may be identified based on a plurality of pieces of vehicle data that are accumulated.

When the bus is identified, the process proceeds to step S25, and the corresponding vehicle data is updated, and the image data is added.

Next, a process of transmission of the guide data from the server apparatus 200 to a plurality of signages 300 will be described.

Figure 16:
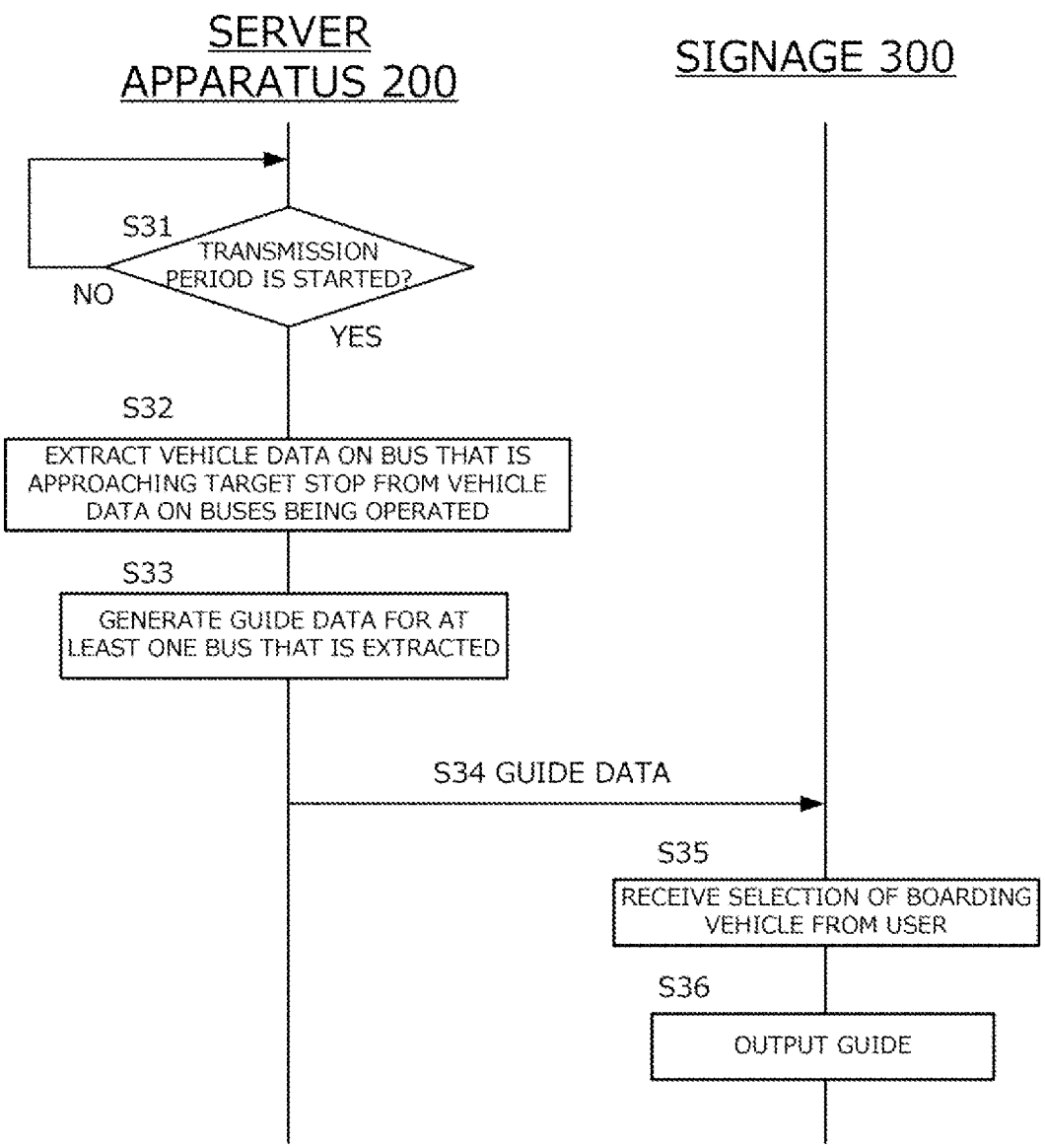
FIG. 16 is a sequence diagram of a process of transmission of the guide data by the server apparatus 200.

FIG. 16 is a sequence diagram of the process of transmission of the guide data from the server apparatus 200 to the signage 300. The illustrated process is repeated every predetermined period of time.

First, in step S31, the information providing unit 2011 determines whether a predetermined transmission period is started or not. In the case where a predetermined period (a period of one minute, for example) is started, the process proceeds to step S32. In the case where the predetermined period is not started, standby is performed for a predetermined time, and the process is repeated.

Steps S32 and S33 are steps in which the information providing unit 2011 generates the guide data for each signage 300.

First, in step S32, the vehicle data on a bus that is approaching a target stop is extracted from pieces of vehicle data on buses that are being operated. Extraction may be performed based on the vehicle data 202A, the signage data 202B, and the route data 202C. More specifically, a route to which the target stop belongs is identified, and a bus that is within a predetermined distance of the target stop (for example, within three stops) or that is approaching a predetermined time (for example, three minutes) of the target stop is extracted from buses that are traveling along the route.

Next, in step S33, the guide data as illustrated in FIG. 7 is generated based on the vehicle data on at least one bus that is extracted. The guide data includes the image data.

The processes in steps S32 and S33 are performed for each of a plurality of signages 300.

The guide data that is generated is transmitted to a target signage 300 in step S34. In the case where there are a plurality of target signages 300, the information providing unit 2011 transmits the guide data to each of the target signages 300.

In steps S35 and S36, the controller 301 (the capturing unit 3011) of each signage 300 generates the user interface screen based on the guide data that is received, and provides guide. More specifically, selection of a boarding vehicle is received from a user in step S35, and information about the selected boarding vehicle is output in step S36. An image of the external appearance of the designated bus may thus be provided to the user.

Additionally, in the present example, an example of outputting information about a traveling bus by the signage 300 is described, but the signage 300 may also generate a user interface screen for requesting operation itself of a bus, and output the same. The user interface screen may be a screen for designating a desired boarding date/time and a desired alighting point, for example.

As described above, with the system according to the first embodiment, the external appearance of a passing bus is captured by using a signage apparatus that is installed at a stop, and the image data is collected. Furthermore, the guide data including the image data is delivered to a plurality of signage apparatuses. According to such a configuration, a user of an on-demand bus may check, at the stop, the external appearance of a bus he/she is getting on, and may smoothly get on board the target bus.

First Modification of First Embodiment

In the first embodiment, the signages 300 installed at a plurality of stops capture the external appearance of a passing bus. However, the external appearance of a bus does not have to be captured on the very day. For example, the server apparatus 200 may store in advance, in association with each other, information that is unique to the vehicle 10 (such as license plate information) and the image data on the external appearance of the vehicle 10. Moreover, the external appearance of a bus may be captured at a time of the bus being dispatched.

In this case, the image data on a specific vehicle 10 may be acquired by including the license plate information or the like in the vehicle data that is transmitted from the vehicle-mounted apparatus 100.

Second Modification of First Embodiment

In the first embodiment, the signages 300 installed at a plurality of stops capture the external appearance of a passing bus, but unique information about the vehicle 10, other than the external appearance, may also be further acquired. For example, the signage 300 may read the license plate information or the like of a target bus in step S22, and may transmit the same to the server apparatus 200 in association with the image data. Furthermore, the unique information about the vehicle 10 may be acquired by means other than the camera (for example, by road-to-vehicle communication). Additionally, recognition of the license plate information may be performed by the server apparatus 200 based on the image data.

Furthermore, information that is acquired in the above manner may be associated with the vehicle data and be used for generation of the guide data.

Furthermore, the signage 300 that is installed at a stop where the target bus is arriving may issue a guide about arrival of the bus based on the unique information about the vehicle 10 described above. For example, in the case where the license plate information or the like of the target bus is included in the guide data, a bus having the same license plate may be detected via the camera 305 and a guide about arrival may thus be issued.

(Modifications)

The embodiment described above is merely an example, and the present disclosure may be changed as appropriate within the scope of the disclosure.

For example, processes and units described in the present disclosure may be freely combined to the extent that no technical conflict exists.

For example, in the description of the embodiment, the server apparatus 200 transmits the guide data about an approaching vehicle 10 to the signage 300 installed at each stop by push notification, and the signage 300 outputs information based on an operation by a user. However, the guide data may be provided by the server apparatus 200 based on a request from the signage 300. For example, the server apparatus 200 may identify the bus that a user is scheduled to get on, based on a request transmitted from the signage 300, and the server apparatus 200 may transmit information (including an image) about the bus to the signage 300. The request may include any data for identifying the bus that a user is scheduled to get on (such as an identifier of the user, an identifier of a boarding reservation, a destination or a route of the bus, and the like).

Furthermore, in the description of the embodiment, a mode is described where the signage 300 installed at each stop provides information, but information may also be provided using different apparatuses. For example, the guide data may be transmitted to a mobile terminal carried by a user, and the mobile terminal may output a guide based thereon. In this case, data associating a stop and the mobile terminal carried by a user who is to get on the on-demand bus at the stop may be stored in the server apparatus 200, and the transmission destination of the guide data may be determined using such data.

Processing described as being performed by one apparatus may be shared and executed by a plurality of apparatuses. Or alternatively, processing described as being performed by different apparatuses may be executed by one apparatus. In a computer system, what hardware configuration (server configuration) each function is realized by can be flexibly changed.

The present disclosure can be realized by supplying a computer program implemented with the functions described in the above embodiments to a computer, and one or more processors that the computer has reading out and executing the program. Such a computer program may be provided for the computer by a non-transitory computer-readable storage medium connectable to a system bus of the computer or may be provided for the computer via a network. As the non-transitory computer-readable storage medium, for example, a disk of a given type such as a magnetic disk (a floppy (R) disk, a hard disk drive (HDD) and the like) and an optical disc (a CD-ROM, a DVD disc, a Blu-ray disc and the like), a read-only memory (ROM), a random-access memory (RAM), an EPROM, an EEPROM, a magnetic card, a flash memory, an optical card, and a medium of a given type that is appropriate for storing electronic commands are included.

What is claimed is:

1. An information processing apparatus comprising a processor configured to:

acquire a first image that is obtained by capturing an external appearance of a first vehicle that is operated as an on-demand bus; and provide the first image to a first user who is to get on board the first vehicle, wherein the processor:

outputs the first image via a first signage apparatus that is installed at a first stop where the first vehicle is scheduled to arrive;

acquires position information on the first vehicle, and identifies the first stop where the first vehicle is scheduled to arrive, based on the position information; and acquires, from a second signage apparatus that is installed at a second stop where the first vehicle arrives before the first stop, the first image that is captured by a camera installed at the second signage apparatus.

2. The information processing apparatus according to claim 1, further comprising a storage configured to store a plurality of images that are obtained by capturing external appearances of a plurality of vehicles that are each operated as the on-demand bus, wherein the processor acquires the first image from the storage.

3. The information processing apparatus according to claim 2, wherein the plurality of images are images that are each captured by a camera of a signage apparatus that is installed at each of a plurality of stops where the on-demand bus travels to or through.

4. The information processing apparatus according to claim 2, wherein the storage stores each of the plurality of images in association with position information on a corresponding vehicle.

5. An information processing system comprising at least one signage apparatus installed at, at least one stop where an on-demand bus travels to or through, and an information processing apparatus that provides information about the on-demand bus via the at least one signage apparatus, wherein the information processing apparatus includes a first processor configured to:

acquire a first image that is obtained by capturing an external appearance of a first vehicle that is operated as the on-demand bus; and provide the first image to a first user who is to get on board the first vehicle, via one of the at least one signage apparatus, wherein the processor:

outputs the first image via a first signage apparatus that is installed at a first stop where the first vehicle is scheduled to arrive;

acquires position information on the first vehicle, and identifies the first stop where the first vehicle is scheduled to arrive, based on the position information; and acquires, from a second signage apparatus that is installed at a second stop where the first vehicle arrives before the first stop, the first image that is captured by a camera installed at the second signage apparatus.

6. The information processing system according to claim 5, wherein each of the at least one signage apparatus captures an external appearance of an arriving vehicle by a camera, and transmits an image that is obtained to the information processing apparatus.

7. The information processing system according to claim 6, wherein the information processing apparatus further includes a storage configured to store a plurality of images that are received from a plurality of the signage apparatuses, and the first processor acquires the first image from the storage.

8. The information processing system according to claim 7, wherein the storage stores each of the plurality of images that are received, in association with position information on a corresponding vehicle.

9. A signage apparatus that is communicably connected to an information processing apparatus that manages operation of an on-demand bus, and that is installed at a stop where the on-demand bus arrives, the signage apparatus comprising a processor configured to:

capture an external appearance of a first vehicle arriving at the stop by a camera installed at the signage apparatus to obtain first image data, and transmit the first image data via the information processing apparatus to a signage apparatus installed at a next stop where the first vehicle is scheduled to arrive next, the first image data being provided to a user who is to get on board the first vehicle at the next stop; and receive, from the information processing apparatus, second image data that is obtained by capturing an external appearance of a second vehicle that is scheduled to arrive at the stop, and output the second image data, the second image data being captured by a camera installed at a signage apparatus of a previous bus stop where the second vehicle arrives before the stop.

10. The signage apparatus according to claim 9, wherein the processor further acquires operation information on the second vehicle from the information processing apparatus, and outputs the operation information and the second image data.

* * * * *